United States Patent [19]

McCarty

[11] Patent Number: 4,652,241
[45] Date of Patent: Mar. 24, 1987

[54] PLANNING AND CONTROL SYSTEM FOR REGULATING FOOD CONSUMPTION

[76] Inventor: Barbara A. McCarty, 1251 Ella Grasso Blvd., New Haven, Conn. 06511

[21] Appl. No.: 772,174

[22] Filed: Sep. 3, 1985

[51] Int. Cl.$^4$ ............................................. G09B 19/00
[52] U.S. Cl. ..................................... 434/127; 434/430
[58] Field of Search ......................... 434/127, 113, 430

[56] References Cited

U.S. PATENT DOCUMENTS

| | | | |
|---|---|---|---|
| 3,307,274 | 3/1967 | Glaser | 434/113 X |
| 3,769,720 | 11/1973 | Terrones | 434/127 |
| 4,112,598 | 9/1978 | Maas et al. | 434/430 |
| 4,310,316 | 1/1982 | Thomann | 434/127 |

*Primary Examiner*—William H. Grieb
*Attorney, Agent, or Firm*—Mattern, Ware, Stoltz & Fressola

[57] ABSTRACT

By providing a plurality of independent, readily identifiable, movable members, each of which represents a pre-defined food group and portion and positioning the movable members in cooperative association with meal designating zones, a unique, highly flexible food consumption, planning and control system is achieved. The plurality of movable members comprise in their entirety, all of the food to be consumed by an individual in one day, and the meal designating zones identify all of the meals to be eaten by that individual during one day. By moving each food designating member from an intake designating zone to a meal designating zone, for each food group and portion consumed during that meal, the individual can quickly and easily control and record the food to be consumed, as well as develop diverse, varied meals within the desired maximum caloric intake allowed.

16 Claims, 10 Drawing Figures

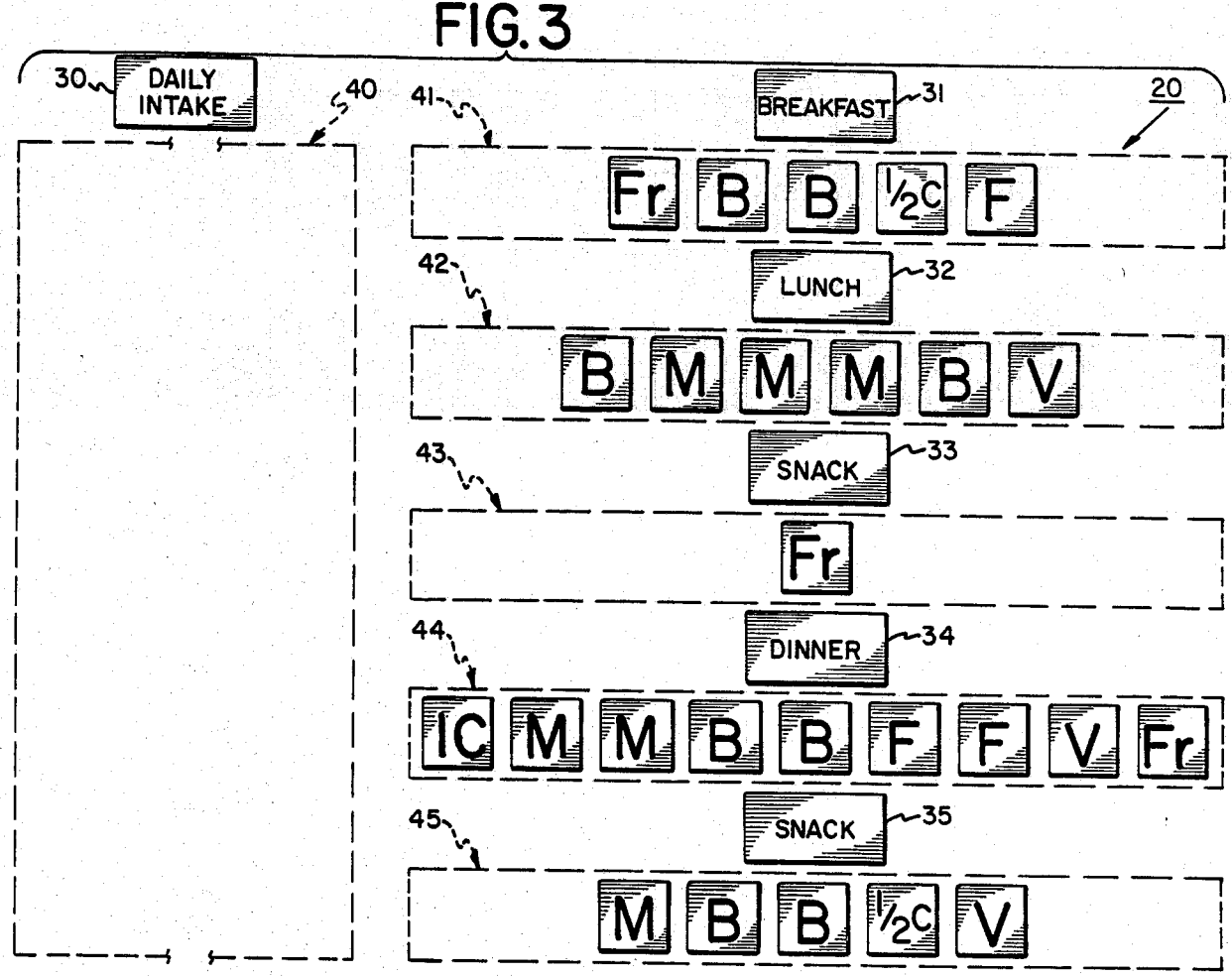
FIG. 3
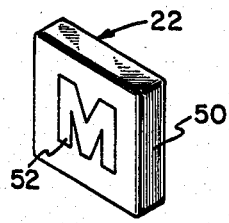
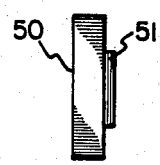
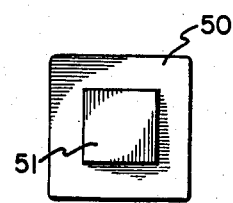
FIG. 4   FIG. 5   FIG. 6
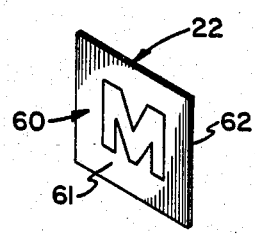
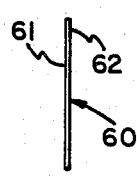
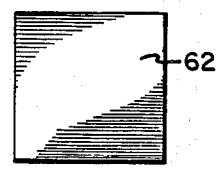
FIG. 7   FIG. 8   FIG. 9

PLANNING AND CONTROL SYSTEM FOR REGULATING FOOD CONSUMPTION

TECHNICAL FIELD

This invention relates to diet control systems and more particularly to a highly flexible, food consumption planning and control system.

BACKGROUND ART

For years, maintaining a physically fit and healthy body has been the goal of an increasing number of individuals. As a major part of this goal, these individuals have employed various diets, either to lose weight, to maintain one's present weight, or to assure that only well-balanced meals are consumed.

In order to assist these people, many systems and programs have been developed. However, these prior art systems have been unable to provide the convenience and flexibility being sought by consumers. As a result, these prior art systems have failed to satisfy the need for a food intake control system which is both flexible and easy to use.

One of the most common prior art diet control systems employs estimating the calories each item of food being consumed represents and counting the total calories being consumed during one day in order to maintain a pre-set maximum calorie intake level. Typically, these systems always fail due to the difficulty in estimating the calories in food being consumed, as well as the inherent difficulty of counting and planning in advance for meals to be consumed.

Although calorie counting has been approached in many ways, these systems all suffer with the same drawbacks. In addition to the counting problems, another important problem is these systems' inability to effectively deal with the requirement that dieter's maintain well-balanced meals consisting of all food groups, in order to assure that no adverse effects will be realized from the particular diet program being used. Also, prior art diet programs and systems are traditionally rigid and limited to specific food types and meals which can be consumed without jeopardizing the diet program. As a result, these prior art diet programs and systems are short lived and fail to attain the results which the individual was seeking to realize.

Therefore, it is a principal object of the present invention to provide a food consumption planning and control system which is highly flexible, does not require calorie counting, and allows an individual to vary the foods being eaten for any meal, while still maintaining the maximum caloric intake for a particular day.

Another object of the present invention is to provide a food consumption planning and control system having the characteristic features described above which is easy to use and does not require an individual to identify and count the calories being consumed in any particular food.

Another object of the present invention is to provide a food consumption planning and control system having the characteristic features described above which assures that the foods being consumed are well-balanced and represent all of the desirable food groups, without being burdensome or limited.

Other and more specific objects will in part be obvious and will in part appear hereinafter.

SUMMARY OF THE INVENTION

In the present invention, all of the prior art difficulties and drawbacks have been completely eliminated and overcome by employing a plurality of independent, readily identifiable, movable members, each of which represents or corresponds to a specific, pre-defined, easily determined, food group and portion which that individual is allowed to consume during the day. In addition, the total quantity of movable members available to the individual equals all of the food which the individual should consume in one day to attain the desired caloric intake, as well as the desired well-balanced intake from all food groups.

In addition to the independent, readily identifiable, movable members representing the pre-defined food groups and portions the individual is to consume during the day, the planning and control system of the present invention also incorporates a plurality of zone designating members. These zone designating members establish separate areas into which the movable members may be placed. Preferably, the zone designating members are captioned to identify one specific zone, such as the "Daily Intake" zone or one of the meals consumed by the individual during the day such as "Breakfast", "Lunch", "Dinner" or "Snack".

By employing the planning and control system of the present invention, an individual has the freedom to decide the type and quantity of food desired for any particular meal or snack, provided the total number of food designating movable members is not exceeded by the amount of food consumed at the end of the day. In using the system of the present invention, an individual would decide on the food desired for breakfast, and would then move the particular food group/portion designating members from the "Daily Intake" zone to the "Breakfast" zone.

The same process is followed for each and every other meal and snack consumed during the day. In this way, the individual is assured that food from all of the desired, well-balanced food groups are consumed during the day, while also being assured that the total amount of food eaten during the day was limited to the pre-set, desired, specific total calorie intake.

By employing the system of the present invention, the individual has total control and flexibility over the types of foods to be eaten and the time when the desired foods are eaten. As a result, a highly flexible, easily employed, food consumption planning and control system is achieved, by which an individual can easily maintain a well-balanced diet without rigid limitations.

The invention accordingly comprises the feature of construction, combinations of elements and arrangement of parts which will be exemplified in the constructions hereinafter set forth, and also comprises the steps and the relation of one or more of such steps with respect to each of the others, all as exemplified in the following detailed disclosure, and the scope of the invention will be indicated in the claims.

THE DRAWINGS

For a fuller understanding of the nature and object of the invention, reference should be had to the following detailed description taken in connection with the accompanying drawings, in which:

FIG. 3 is a plan view of the food consumption planning and control system of the present invention, with the food designatign movable members shown in cooperative association with the zone designating members in the manner in which the planning and control system of this invention would appear at the end of a typical day;

FIG. 4 is a perspective view of one embodiment of one of the movable members employed in the food consumption planning and control system of this invention.

FIG. 5 is a side elevation view of the movable member of FIG. 4;

FIG. 6 is a rear elevational view of the movable member of FIG. 4;

FIG. 7 is a perspective view of an alternate embodiment of one of the movable members employed in the food consumption planning and control system of this invention;

FIG. 8 is a side elevational view of the movable members of FIG. 7;

FIG. 9 is a rear elevational view of the movable member of FIG. 7; and

DETAILED DISCLOSURE

Figure 1:
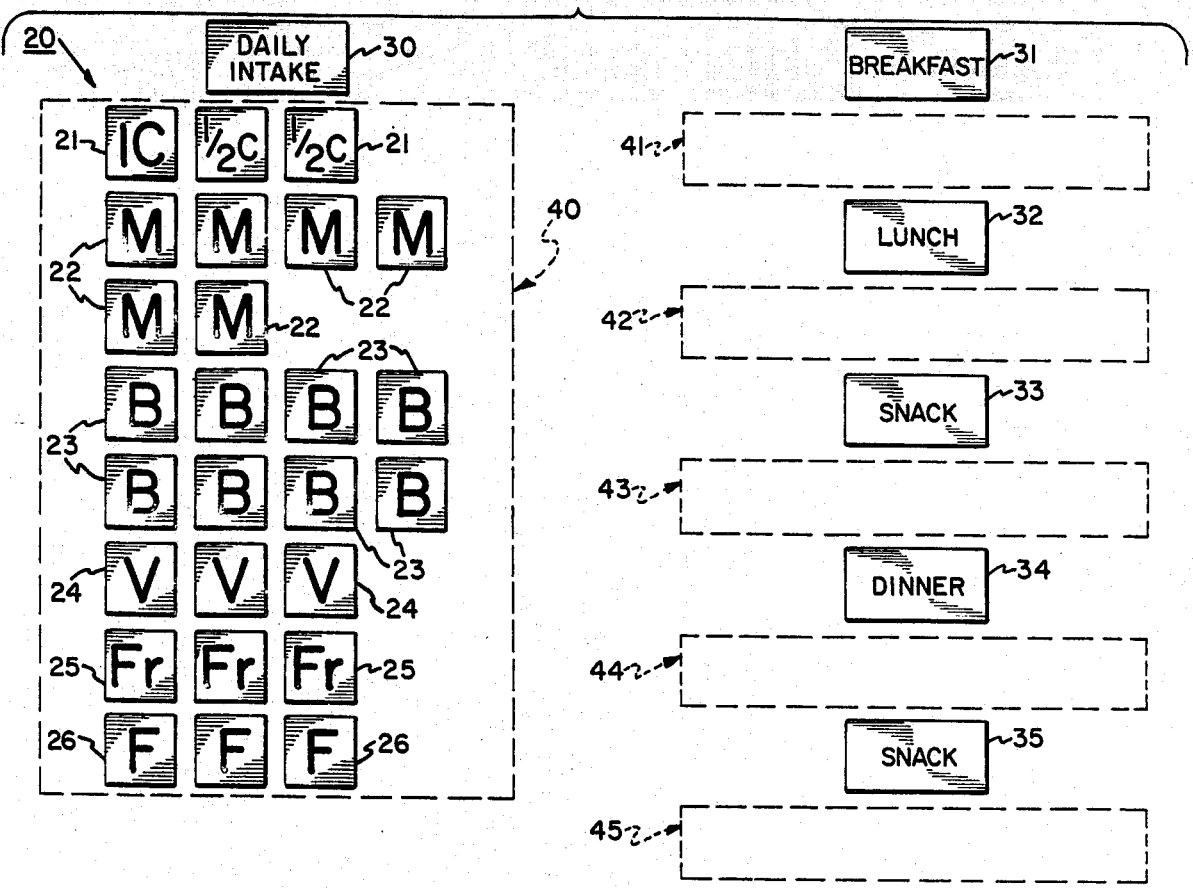
FIG. 1 is a plan view of a food consumption planning and control system of the present invention showing the plurality of independent, readily identifiable, food designating movable members in cooperative association with zone designating members, displayed in the manner the planning and control system of the present invention would appear at the beginning of every day.

In FIG. 1, food consumption planning and control system 20 of the present invention is shown incorporating a plurality of independent, movable, readily identifiable, food group/portion designating members 21, 22, 23, 24, 25, and 26. In addition, this embodiment of food consumption, planning and control system 20 incorporates a plurality of independent, zone defining members 30, 31, 32, 33, 34, and 35. Preferably, each of the zone defining members incorporates indicia on the face thereof identifying the particular zone or area established thereby.

As shown in FIG. 1, zone defining member 30 establishes the zonal area 40 into which all of the plurality of independent, readily identifiable, food group/portion designating members 21, 22, 23, 24, 25, and 26 are positioned at the start of every day. Since the plurality of food group/portion designating members 21, 22, 23, 24, 25, and 26 represent all of the food which a particular individual using this system is allowed to consume during one day, zonal area 40 is preferably designated and identified by zone designating member 30 as "Daily Intake".

The remaining zone designating members 31, 32, 33, 34, and 35 preferably designate and establish zonal areas representing the various meals to be consumed by the individual during one day. As a result, zone designating member 31 preferably incorporates indicia thereon which represents "Breakfast" and establishes thereby zonal area 41. Similarly, zone designating member 32 incorporates indicia representing the "Lunch" meal and establishes zonal area 42 in association therewith.

Similarly, zone designating member 33 incorporates indicia representing "Snack" and establishes zonal area 43, while zone designating member 34 incorporates indicia representing "Dinner" and establishes zonal area 44. Finally, zone designating member 35 incorporates indicia representing a late night "Snack" and establishes the final zonal area 45.

Although conventional, common words are employed as the indicia on zone designating members 30, 31, 32, 33, 34 and 35, any desired indicia can be employed to achieve the same result, without departing from the scope of this invention.

In order to provide the individual employing food consumption, planning and control system 20 of the present invention with a nutritional, well-balanced diet, while still providing the individual with the ability to widely vary the type and amount of food being consumed at any particular time, the plurality of independent, movable food group/portion designating members are separated into six, distinct food categories, with a pre-determined number of movable members being assigned to each particular food category, depending upon the diet and person involved. These six food groups or food types comprise the six, well-known food groups which assure a nutritional well-balanced diet and incorporate virtually all types of foods. These groups are (1) milk foods, (2) meat or high protein foods, (3) bread or starchy foods, (4) vegetables, (5) fruits, and (6) fats.

Figure 2:
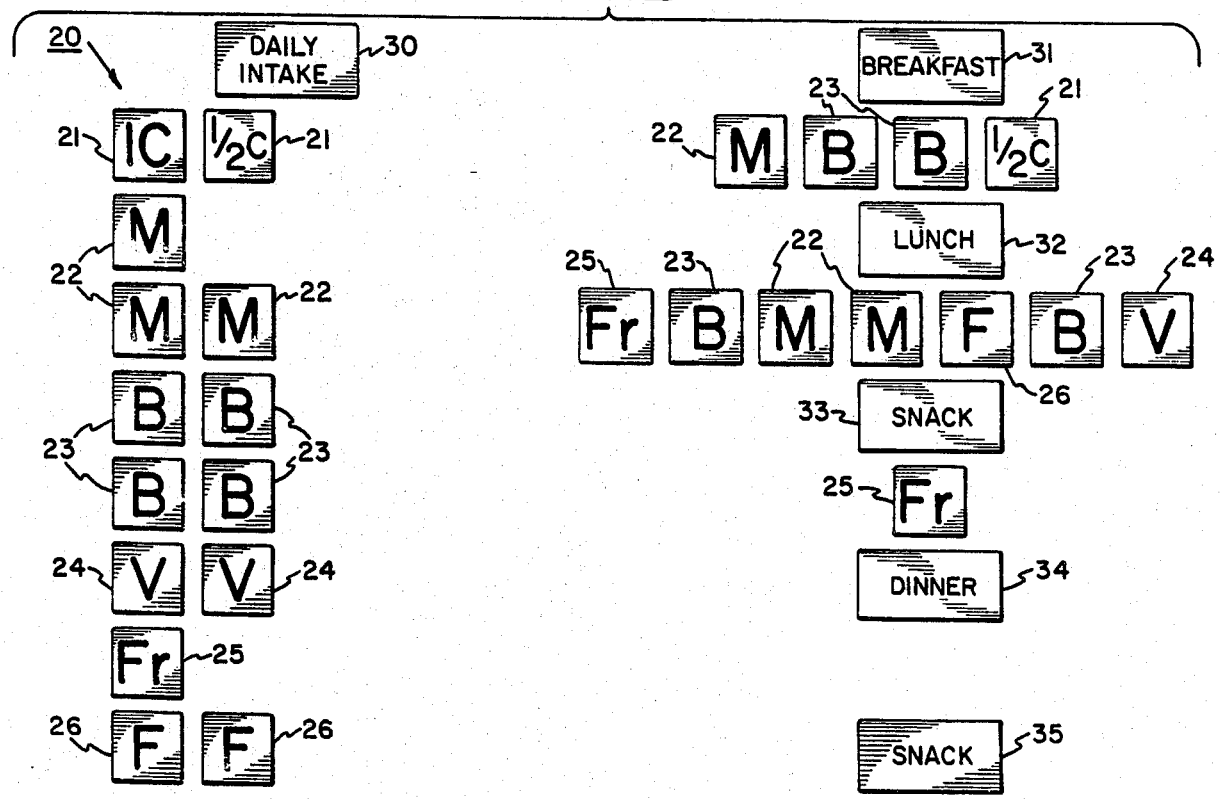
FIG. 2 is a plan view of the food consumption planning and control system of the present invention showing the plurality of independent, food designating movable members in cooperative association with zone designating members displayed in a manner representing the planning and control system of the present invention after an afternoon snack.

In the example depicted in FIGS. 1-3 the six movable members 22 represent the total number of pre-defined portions this particular individual is allowed to consume in any one day from the meat food group. Similarly, the eight, independent, readily identifiable, movable members 23, designate the total number of pre-defined portions the individual can eat in one day from the bread food group.

The vegetable food group is represented by the three readily identifiable, movable members 24, while the fruit food group is represented by the three, readily identifiable, movable members 25. The fat food group is represented by three readily identifiable, movable members 26, while the milk food group is represented by three readily identifiable, movable members 21.

As is readily apparent to any skilled nutritionist, the quantity of movable members which would define the daily intake for any particular individual will vary with that individual's particular needs and physical makeup. For purposes of example only, movable members 21, 22, 23, 24, 25, and 26 have been selected to represent a fifteen hundred calorie diet, consisting of fifty percent carbohydrate, twenty percent protein and thirty percent fat. As is readily apparent, this example is used for explanatory purposes only and is not intended in any way to limit the scope of this invention.

As briefly discussed above, in addition to designating a specific food group, each of the movable members also represents a specific, pre-defined quantity of food or portion which the individual may consume for each movable member. By way of example, the three movable members 24 represent the entire quantity of food the individual is allowed to eat from the vegetable food group. In the preferred embodiment, each movable member 24 corresponds to a "unit" of vegetables which contains about five grams of carbohydrate, two grams of protein, and twenty-five calories. This is equivalent to one-half cup of most cooked vegetables or one cup of most raw vegetables.

As is more fully explained below, for each half-cup of cooked vegetables which is consumed by the user, one movable member 24 is removed from zonal area 40, representing the Daily Intake, and placed in the zonal area corresponding to the particular meal when this quantity or unit of vegetable was consumed.

For ease of simplicity and use, the readily identifiable, movable, food group/portion designating members 21, 22, 23, 24, 25, and 26 are preferably based upon the food group Exchanges which have been standardized by the U.S. Department of Agriculture in its Nutritive Value of American Foods—Agricultural Handbook No. 8. In addition, the virtually identical Exchange list is employed by the American Diabetic Association for use by Diabetics in assuring the consumption of well-balanced diets. As a result, many food lists are readily available for a user of the present invention which allows that individual to easily determine the plurality of different foods contained in each of the designated food groups, as well as the quantity of food associated with one particular unit or portion in each food group, as represented by a movable member.

By way of example, each movable member 23 represents one slice of white, rye, or whole-wheat bread, which also equals about fifteen grams carbohydrate, two grams of protein, and approximately seventy calories. In addition, the bread food group also includes crackers, cereals, pasta, rice, popcorn, etc., and starchy vegetables. It is generally accepted that one-half cup of rice or pasta equals one bread unit, while three-quarters cup of most cereals also equals one bread unit. Using the other references discussed above, the many other equivalents for one bread unit, or one movable member 23, are easily obtained.

In general, each movable member 22 represents one ounce of meat, which is equivalent to about seven grams of protein, five grams of fat, and approximately seventy calories. The meat food group also includes poultry, fish, cheese and other protein-rich foods. The precis quantity or weight of these other foods is easily found from the various readily available references discussed above.

As is readily apparent from the foregoing detailed discussion, a wide variety of foods and food portions can be consumed by an individual for any particular meal without deviating from the overall diet program provided by the food consumption planning and control system of the present invention. In this way, an individual is capable of making many independent decisions as to the amount of food to be eaten for a particular meal, as well as the type of food to be eaten for that meal, without deviating from the overall diet program. As a result, better compliance and long-term use of this system is realized.

By referring to FIGS. 1, 2 and 3, the implementation and actual daily use of food consumption planning and control system 20 of this invention can best be understood. In general, as discussed above, an individual using this system would start each day by positioning the plurality of movable members 21, 22, 23, 24, 25, and 26 in zonal area 40, representing all of the food which the individual may consume during that day.

Then, the individual would decide on the food desired for Breakfast. Once this decision has been made, the movable members representing the food group/portions consumed for Breakfast would be moved from zonal area 40 and placed in zonal area 41, representing the breakfast meal.

The breakfast shown in FIG. 2 consists of two bread units 23, one meat unit 22, and a half-cup of milk. This type and quantity of food is equivalent to the individual eating two slices of bread, one ounce of ham or bacon, and a half-cup of milk. However, the exactly same food portion/group designating members 21, 22, and 23 also equal the consumption of one and one-half cups of cereal with a half-cup of milk and an ounce slice of breakfast meat. As a result, it is readily apparent that the user of system 20 of the present invention may eat a wide variety of foods, while being able to quickly and easily maintain an accurate, readily available record of both the precise type and quantity of food being consumed.

FIG. 2 also displays a typical lunch meal consisting of two movable members 23, representing two units selected from the bread food group, two movable members 22 representing two units from the meat group, one movable member 24 representing one unit selected from the vegetable food group, one movable member 25 representing one unit from the fruit group, and one movable member 26 representing one unit selected from the fat food group. Although capable of wide variety, these movable members could represent one sandwich with two ounces of meat and one cup of lettuce, with an apple for dessert.

By providing food consuming planning and control system 20 of the present invention with its plurality of movable members and its plurality of cooperating zonal areas, the individual employing system 20 of the present invention is able to easily record the precise type and quantity of food consumed during the day. In addition, system 20 simultaneously provides an automatic display of the precise food groups and food quantities from which the individual can select for the meals retaining during that day. As a result, the burden of counting calories and computing the caloric intake remaining for one day is totally eliminated, since the movable members remaining in zone 40 at any particular time of the day quickly informs the user of the precise food groups and portions which can be eaten during the remainder of the day. In addition, by selecting from only the available food group/portion designating members 21, 22, 23 24, 25, and 26 and accounting for every type of food consumed with one of the movable members, the individual is assured of a well-balanced nutritional diet, with the maximum, desired caloric intake being automatically achieved. Furthermore, by skipping certain meals, or snacks, the individual can easily plan ahead to enjoy larger quantities of certain foods for a particular meal, thereby accommodating special occasions. As a result, the individual is capable of maintaining the desired diet simply and easily, without undue burden or difficulties.

As would be readily apparent to one of ordinary skill in the art, a plurality of independent, movable, readily identifiable, food group/portion designating members 21, 22, 23, 24, 25, and 26 and the zone designating members 30, 31, 32, 33, 34, and 35 may be made in a variety of various constructions, without departing from the scope of this invention. In the preferred embodiment, it has been found that magnetic members or magnetically backed members provide the best configurations, in order to enhance the ease of movability and ready securement desired in employing this system, while also allowing ease of use and constant display in high visibility locations such as refrigerator doors or other convenient metal surfaces. In FIGS. 4, 5, and 6, one embodiment of a food designating movable member is shown. For purposes of example only, the movable member is depicted as a meat group/portion designating member 22. Except for size, this embodiment also represents the construction of the zone designating members.

Movable member 22 is shown in FIGS. 4, 5, and 6 as a tile member 50, such as a ceramic tile, to which a magnetic strip 51 has been securely affixed on the back surface thereof. In addition, tile member 50 incorporates indicia 52 on the front face thereof, in order to designate this particular tile member as one meat group/portion designating member.

Although the letter "M" is employed as indicia 52 in the example shown in FIG. 4, any other readily identifiable indicia may be employed with equal efficacy, such as colors, pictures, alphanumeric symbols, Braille, etc. If desired, a combination of symbols could be employed such as alphanumeric designations and color coding.

In FIGS. 7, 8, and 9, an alternate embodiment for the movable members is depicted. As discussed above, a movable member 22 is shown for exemplary purposes only, since this embodiment is equally applicable to all of the other movable, food group/portion designating members, as well as the zone designating members.

In this embodiment, movable member 22 comprises a single, integral, dual layer composite member 60 which comprises a first layer 61 and a second, magnetic layer 62 integrally fused or affixed together. Inasmuch as member 60 comprises substantially thinner material than tile members 50, it has been found that the ease of manufacture, use and storage is greatly enhanced by employing member 60.

In addition, as shown in FIG. 7, dual layered member 60 incorporates readily identifiable indicia thereon in order to allow the user to quickly and easily identify the particular food group/portion represented by member 60. In FIG. 7, member 60 incorporates the letter "M" imprinted on the top surface of layer 61 to identify member 60 as designating a meat group/portion member 22. However, as discussed above, any indicia can be employed to identify the particular food group/portion desired. This identification can be visual using any combination of alphanumeric symbols, pictures, colors, etc. or can be tactile, using indicia such as raised letters or Braille.

Regardless of the identifying means employed, movable member 60 represents a readily identifiable food group/portion, which the user can quickly determine and mentally convert to the specific desired food group and portion which the member is intended to represent. In this way, the use has complete flexibility in selecting the particular food to be eaten, while automatically assuring that the precisely desired maximum caloric intake is maintained and a desired, well-balanced nutritional combination of foods are consumed.

Figure 10:
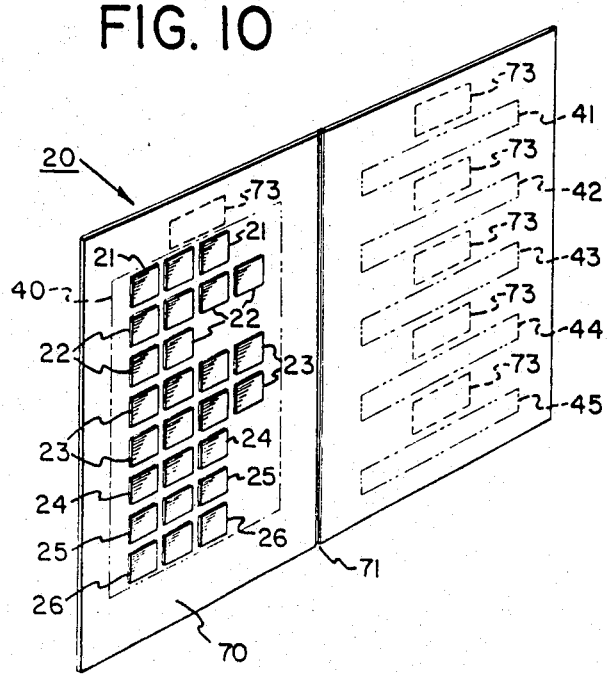
FIG. 10 is a perspective view of another alternate embodiment of the present invention depicting a portable, easily transported food consumption planning and control system in accordance with the present invention.

In FIG. 10, an alternate embodiment for the food consumption, planning and control system 20 of the present invention is depicted. In this embodiment, readily identifiable, movable, food group/portion designating members 21, 22, 23, 24, 25, and 26 are mounted on a metalized board 70. In this embodiment, metalized board 70 incorporates at least one pre-formed fold line 71, along which board 70 can be folded. In this way, board 70 is compacted into a smaller area, thereby achieving a completely portable and easily transported planning and control system 20 which the user can easily employ throughout the day in order to further enhance compliance.

In this embodiment, as depicted in FIG. 10, independent, movable, zone designating members are not required, since zone designating indicia 73 are printed directly on the surface of metalized board 70. In this way, the desired zonal areas are created and established by indicia 73 which establishes the particular zonal areas into which the movable members are positioned in accordance with the food consumed by the individual during a particular meal, as fully detailed above. If desired, board 70 could be foldable along a plurality of lines to allow board 70 to be compacted to fit in small areas. In this way, the usability of the system of the present invention is further enhanced, with full compliance being more easily attained.

In constructing the movable members of the present invention, any convenient size can be used, as well as any particular shape. Although squares and rectangles have been depicted throughout the drawings, it is readily apparent that circles, ovals or any other convenient shape can be employed with equal efficacy, without departing from the scope of the invention. For purposes of convenience and explanation, it has been found that the food group/portion designating members preferably comprise square shape members with each side of the square comprising a length of between about one-half to one inch. In addition, the zone designating members preferably comprise rectangular shape pieces having one side incorporating a length of between about one inch and two and one-half inches and a width between about one-half inch to one inch. With these members, any convenient metal surface is employed, such as refrigerators, stoves, etc. However, if desired, a separate metal sheet could be employed comprising a size and shape which would accommocate the particular size movable, magnetic members detailed above.

In the portable, travel kit shown in FIG. 10, the movable, readily identifiable food group/portion designating members preferably comprise square shape members, each side of which comprises a length of about one-quarter to one-half inches. In this way, a portable travel embodiment of the present invention can be constructed in a very convenient size for ease of use and ease of portability.

It will thus be seen that the objects set forth above, among those made apparent from the preceding description, are efficiently attained, and since certain changes may be made in carrying out the above method and in the construction set forth without departing from the scope of the invention, it is intended that all matter contained in the above description or shown in the accompanying drawings shall be interpreted as illustrative and not in a limiting sense.

It will also be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A planning and control system for regulatlng the food consumption of an individual comprising:
A. plurality of independent, readily identifiable, movable members, a. each of the movable members corresponding to a pre-defined food group and portion, and being unlimited as to meal or time designation, and;

b. the totality of movable members corresponding to all of the food groups and portions to be consumed by the individual during a pre-defined period of time; and B. display zones cooperativeLy associated with the movable members for receiving and continuously displaying the movable members positioned therein, said zones being further defined as comprising a. A food availability zone in which all of the movable members are displayed at the beginning of the pre-defined period of time, and b. a food consumed zone in which the movable members are positioned after removal from the food available zone in response to the food group and portions selected by the individual for consumption at any particular time, whereby movable members corresponding to the food groups and portions to be eaten are move from the food availabilitv zone, to the food consumed zone, thereby allowing the individual to easily record all food groups and portions eaten during the pre-defined period of time, while also continuously being informed of all food groups and portions that remain available for consumption during the pre-defined time period.

2. The planning and control system defined in claim 1, wherein said movable members are further defined as incorporating indicia on one surface thereof to readily identify the particular food group and portion represented thereby.

3. The planning and control system defined in claim 2, wherein said indicia comprises one or more selected from the group consisting of numerals, letters, colors, pictures, Braille, and raised alphanumeric symbols.

4. The planning and control system defined in claim 2, wherein said indicia are visually distinctive and distinguishable.

5. The planning and control system defined in claim 2, wherein said indicia are further defined as being tactilly distinctive and distinguishable.

6. The planning and control system defined in claim 2, wherein at least six, independent, readily distinguishable indicia are employed, with each of said indicia corresponding to one of the six different major food groups, whereby the totality of movable members comprises a well-balanced, nutritional food consumption plan.

7. The food planning and control system defined in claim 1, wherein the pre-defined period of time equals one day.

8. The food planning and control system defined in claim 7, wherein said display zones are further defined as comprising a first zone in which all of the available food group/portion designating movable members are positioned at the start of the day, representing all of the food to be consumed by that individual during the day, and remaining display zones representing each of the meals and snacks to be eaten by the individual during the day.

9. A planning and control system for regulating the food consumption of an individual comprising:

A. a plurality of independent, readily indentifiable, movable members, a. each of the movable members corresponding to a pre-defined food group and portion, and being unlimited as to meal or time designation, and;

b. the totality of movable members corresponding to all of the food groups and portions to be consumed by the individual during a pre-defined period of time; and b. display zones cooperatively associated with the movable members for receiving and continuously displaying the movable members positioned therein, said zones being further defined as comprising a. a food availability zone in which all of the movable members are displayed at the beginning of the pre-defined period of time, and b. a food consumed zone in which the movable members are positioned after removal from the food available zone in response to the food group and portions selected by the individual for consumption at any particular time, C. a plurality of movable, zone designating members, for identifying the plurality of display zones, and comprising a. a first zone designating member comprising indicia thereon to establish for immediate identification the food availability zone, and b. a plurality of meal designating members each of which comprise indicia thereon designating the different meals and snacks to be eaten by the individual during the pre-defined period of time, whereby the individual can easily move the members corresponding to the food groups and portions eaten at a particular meal from the food availability zone to the particular meal designating zone for which those food groups were consumed, thereby allowing a continuous, display of all food groups and portions eaten at each of the particular meals, as well as all of the food groups and portions that remain available for consumption during the pre-defined time period.

10. The food planning and control system defined in claim 9, wherein said movable members are further defined as incorporating magnetic portions affixed thereto, thereby allowing said movable members to be easily mounted on any available metal surface and easily moved between alternate positions.

11. The food planning and control system defined in claim 10, wherein said movable members are further defined as comprising ceramic tiles with a magnetic strip securely affixed to the back surface thereof.

12. The food planning and control system defined in claim 1, wherein said movable members are further defined as comprising integral, dual-layered composite strips, with the rear layer thereof being magnetic and the top layer thereof comprising identifying indicia.

13. The food planning and control system defined in claim 1, wherein said system further comprises C. a board on which said movable members are securely mounted for retention thereon in any desired location, with said movable members being readily movable from one position to another.

14. The food planning and control system defined in claim 1, wherein said board is further defined as being foldable with said movable members mounted thereto, thereby attaining a food planning and control system which is compact and portable.

15. A method for regulating food consumption of an individual comprising the steps of A. obtaining a plurality of movable members corresponding to pre-defined food groups and portions, with said movable members being unlimited as to meal or time designations, and with the totality of movable members corresponding to all of the food groups and portions to be consumed by the individual during a pre-defined period of time;

B. positioning said movable members in a first display zone with all of the movable members being readily visible, representing all of the food groups and portions to be eaten during said time period;

C. reviewing and deciding from the array of movable members displayed in the first display zone and deciding the quantity of food to be consumed at that particular time;

D. removing from the first display zone the movable members corresponding to the food groups and portions to be consumed;

E. positioning said movable members into a second display zone which represents food group and portions consumed during the pre-determined time period; and F. repeating steps C through E for each additional meal or snack to be consumed during the predetermined time period, provided every food group and portion consumed has had a corresponding movable member transferred from the first display zone to the second display zone, whereby individuals are allowed to easily and conveniently record all food groups and portions eaten during the pre-defined period of time, while also continuously being informed of all food groups and portions that remain available for consumption during the pre-defined time period, while still being provided with greater flexibility ahd choice selection of foods eaten at any particular time, while still maintaining the pre-determined caloric or quantity intake.

16. The method defined in claim 15, comprising the additional steps of:

G. obtaining a plurality of zone designating members, one of which specifically identifies the first display zone as the "food intake" zone, and the remainder of which specifically identifies regions in the second display zone in a manner corresponding to the particular meals and snacks to be consumed during the pre-determined time periods; and H. positioning said movable members corresponding to the food group and portions consumed during a particular meal in the area designated for that particular meal;

whereby the individual employing this method is constantly advised in a visual display of all of the food groups and portions remaining for consumption during the pre-determined time period, as well as the precise food groups and portions consumed by the individual at each particular meal and snack that has been consumed during the time period.

* * * * *